United States Patent [19]
Horie

[11] Patent Number: 5,473,589
[45] Date of Patent: Dec. 5, 1995

[54] INFORMATION RECORDING/REPRODUCING APPARATUS CAPABLE OF PERFORMING READY OPERATION IN RESPONSE TO EXTERNAL LOADING REQUEST

[75] Inventor: Yuji Horie, Tokyo, Japan

[73] Assignee: Olympus Optical Co., Ltd., Japan

[21] Appl. No.: 181,594

[22] Filed: Jan. 13, 1994

[30] Foreign Application Priority Data

Jan. 26, 1993 [JP] Japan .................................. 5-010922

[51] Int. Cl.$^6$ .................................................. G11B 7/00
[52] U.S. Cl. .............................. 369/54; 369/47; 369/76; 360/69
[58] Field of Search ..................... 369/54, 58, 47, 369/77.2, 75.2, 76; 360/69, 71, 96.5, 85, 95

[56] References Cited

U.S. PATENT DOCUMENTS 5,070,418  12/1991  Takahashi .................................. 360/71

FOREIGN PATENT DOCUMENTS 3127377  5/1991  Japan .

*Primary Examiner*—Georgia Y. Epps
*Assistant Examiner*—Muhammad N. Edun
*Attorney, Agent, or Firm*—Laff, Whitesel, Conte & Saret, Ltd.

[57] ABSTRACT

An information recording/reproducing apparatus has a controller for setting the apparatus in a ready state in which at least one of information reproduction, information recording and information erasure can be effected after a recording medium is loaded, in the case where an external request has been detected within a predetermined time period. The controller sets the apparatus in a non-ready state after a recording medium is loaded, in the case where an external request has not been detected within a predetermined time period.

1 Claim, 3 Drawing Sheets

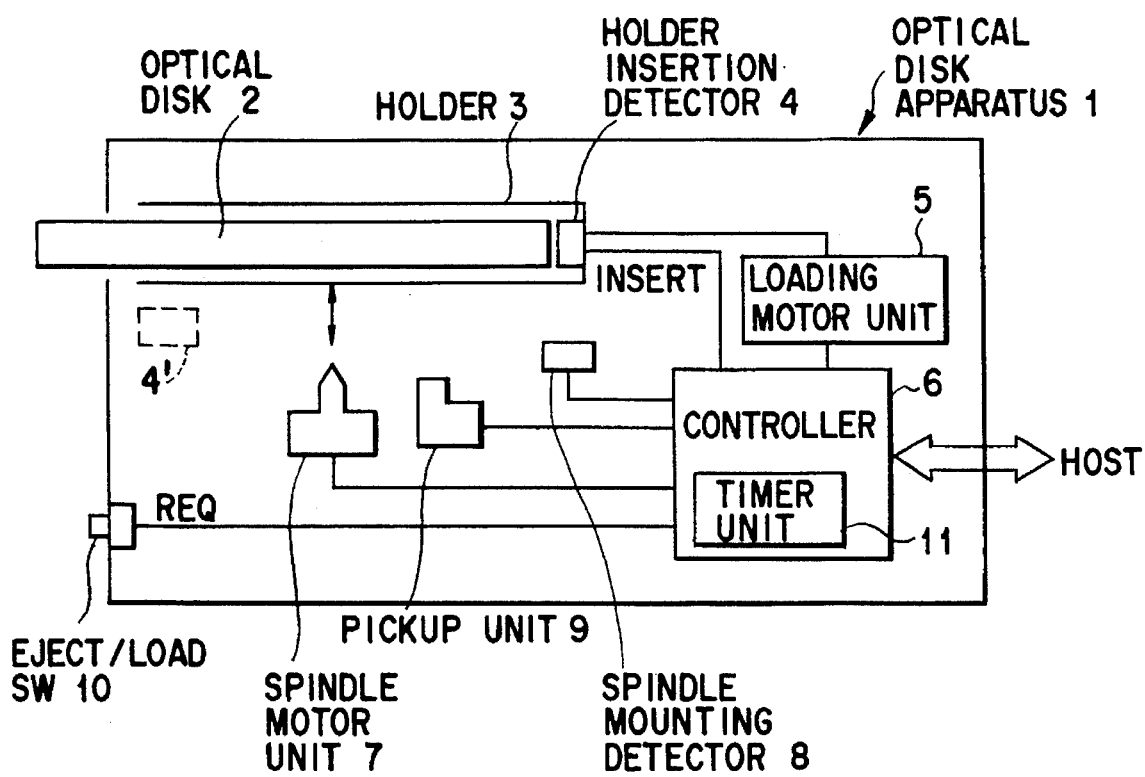
F I G. 1

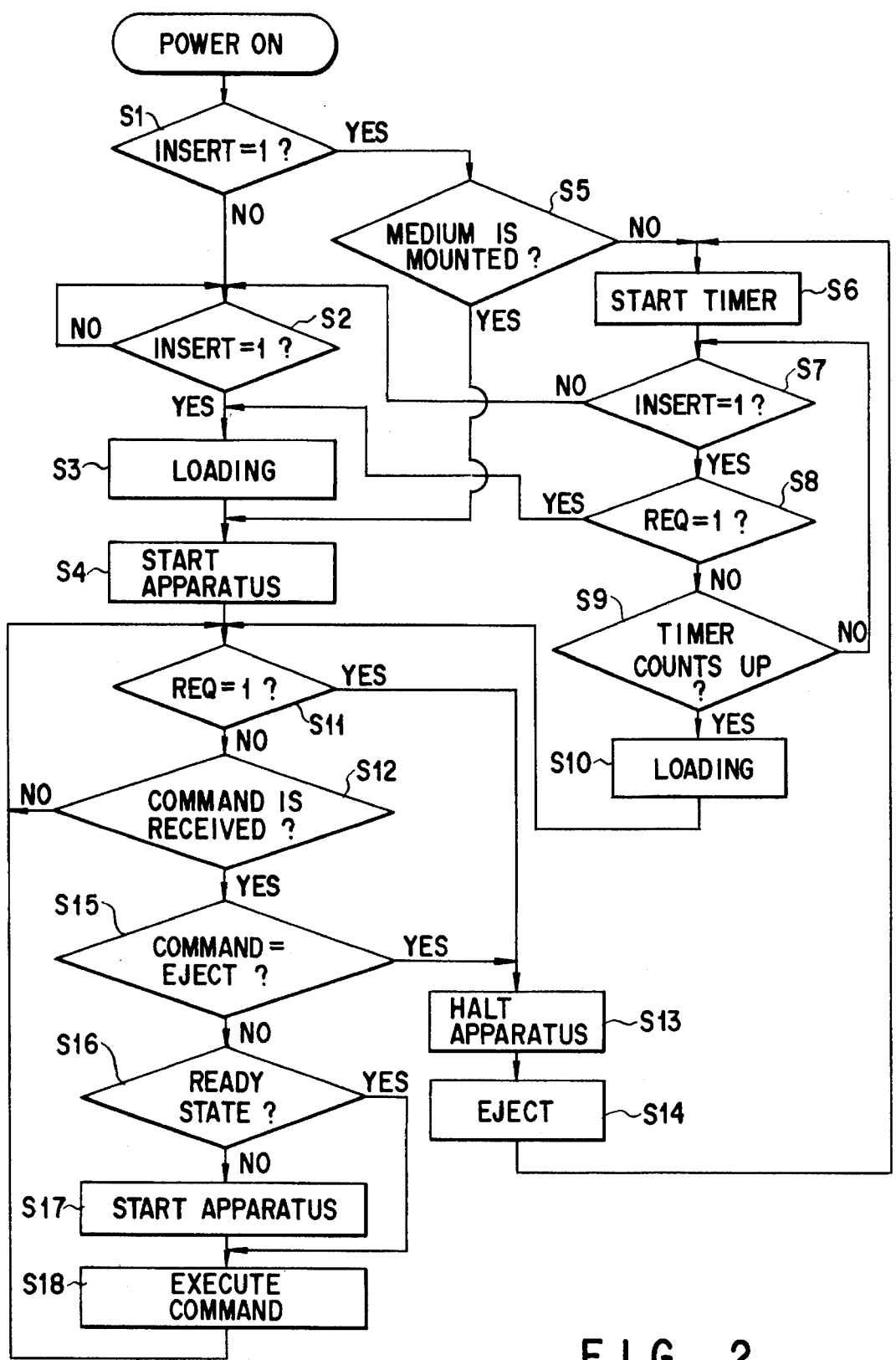
F I G. 2

INFORMATION RECORDING/REPRODUCING APPARATUS CAPABLE OF PERFORMING READY OPERATION IN RESPONSE TO EXTERNAL LOADING REQUEST

BACKGROUND OF THE INVENTION

1. Field of the Invention

The present invention relates to an information recording/reproducing apparatus having a mechanism for automatically loading a recording medium (hereinafter referred to as "auto-loading mechanism").

2. Description of the Related Art

Recently, information recording/reproducing apparatuses, which employ recording media allowing at least one of a recording operation and a reproducing operation to be performed, such as a write-once read-many optical disk and a photo-electro-magnetic type or a phase change type rewritable optical disk, have widely used.

A recording medium employed in these apparatuses is heavier than that employed in a floppy disk drive (FDD), and a driving unit for the recording medium rotates at high speed. Thus, the inertia force is great and about several seconds are needed for stopping or starting the medium driving unit.

When a recording medium is ejected from the FDD, the media is light, the speed of rotation of the medium is low and therefore the inertia force of the medium is weak. Thus, even if the medium is ejected while the driving unit is still rotating, no damage is caused to the driving unit or medium. When an eject switch is turned on, the eject operation and the operation for stopping the driving unit can be performed simultaneously.

On the other hand, the inertia force of the recording medium (e.g. optical disk) employed in the information recording/reproducing apparatus is great. If the medium is ejected while the driving unit rotates, the driving unit or medium is damaged. In this case, for example, the medium comes into contact with the head unit or cartridge, and as a result the medium is damaged. In addition, in the apparatus using the optical disk, etc., a considerable amount of time is needed to stop and start the medium driving unit. Thus, it is not possible to perform the eject operation simultaneously with the depression of the eject switch.

To solve this problem, an auto-eject mechanism is employed to eject the recording medium. According to the auto-eject mechanism, the information recording/reproducing apparatus itself performs a stop operation for stopping the driving unit when the depression by the operator of the eject switch provided on the front face of the information recording/reproducing apparatus is detected or when an eject command from an upper-level host computer is detected, and the medium is automatically ejected after the rotation of the medium is stopped.

The information recording/reproducing apparatus may be provided with an auto-loading mechanism. According to this mechanism, the information recording/reproducing apparatus itself automatically loads the recording medium in the apparatus, when the insertion of the recording medium in the information recording/reproducing apparatus is detected or when the depression of a loading switch (or a loading/eject switch having both functions of rejecting loading and ejecting) for requesting loading of the medium when the medium is in the eject position is detected.

Jap. Pat. Appln. KOKAI Publication No. 3-127377 discloses an example of the information recording/reproducing apparatus employing the auto-loading mechanism. In this apparatus, when a recording medium is left in the eject position for a predetermined time, the medium is automatically loaded in the information recording/reproducing apparatus. In this apparatus, the auto-loading is effected in order to prevent dust, etc. from entering the apparatus through the medium insertion port when the recording medium is left in the eject position for a long time.

When a data file recorded on the recording medium mounted in this information recording/reproducing apparatus is reproduced, when a new file is produced on the medium or when a file is updated, or when a file is deleted it is necessary to instantaneously access to a designated position according to a command from an upper-level host computer. However, as described above, in the apparatus using the optical disk, several seconds are needed to start the driving unit. If the driving unit is stopped, a predetermined location on the medium cannot be accessed immediately. Thus, the conventional information recording/reproducing apparatus is designed such that the driving unit is started immediately after the medium is mounted and, when the medium is mounted, the apparatus is always set in the "ready" state in which data reproduction, data recording and data erasure can be performed.

As described above, the conventional information recording/reproducing apparatus is set in the ready state when the recording medium is mounted, whether or not the medium is accessed immediately. In the ready state, for example, the driving unit for rotating the medium is rotating, the laser for recording/reproducing information is being turned on, and the focusing servo or tracking servo for focusing the laser beam on the recording surface of the medium or making the laser beam scan a predetermined track. Consequently, excess power is consumed, or the life of structural parts such as a laser and the life of the information recording/reproducing apparatus are shortened.

SUMMARY OF THE INVENTION

The object of the present invention is to provide an information recording/reproducing apparatus having a function of automatically loading a recording medium which has been left in an eject position for a predetermined time period, wherein the apparatus can be selectively set in the ready state according to the state in which a loading command is issued, whereby excess power consumption is reduced and the life of the apparatus can be increased.

In order to achieve the above object, there is provided an information recording/reproducing apparatus, comprising:

loading means for automatically loading a recording medium in a predetermined position within the apparatus;

detecting means for detecting whether or not an external request is issued within a predetermined time period after the recording medium is left in an eject position where the recording medium can be inserted in and removed from the apparatus; and control means for setting the apparatus in a ready state in which at least one of information reproduction, information recording and information erasure can be effected, after the recording medium is loaded by the loading means, in the case where the detecting means has detected the external request within the predetermined time period, and for setting the apparatus in a non-ready state after the recording medium is loaded by the loading means, in the case where the detecting means has not detected the external request within the predetermined time period.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the structure of an optical disk apparatus according to a first embodiment of the present invention;

FIG. 2 is a flow chart illustrating the operation of the apparatus according to the first embodiment of the invention.

DETAILED DESCRIPTION OF THE EMBODIMENTS

Figure 3:
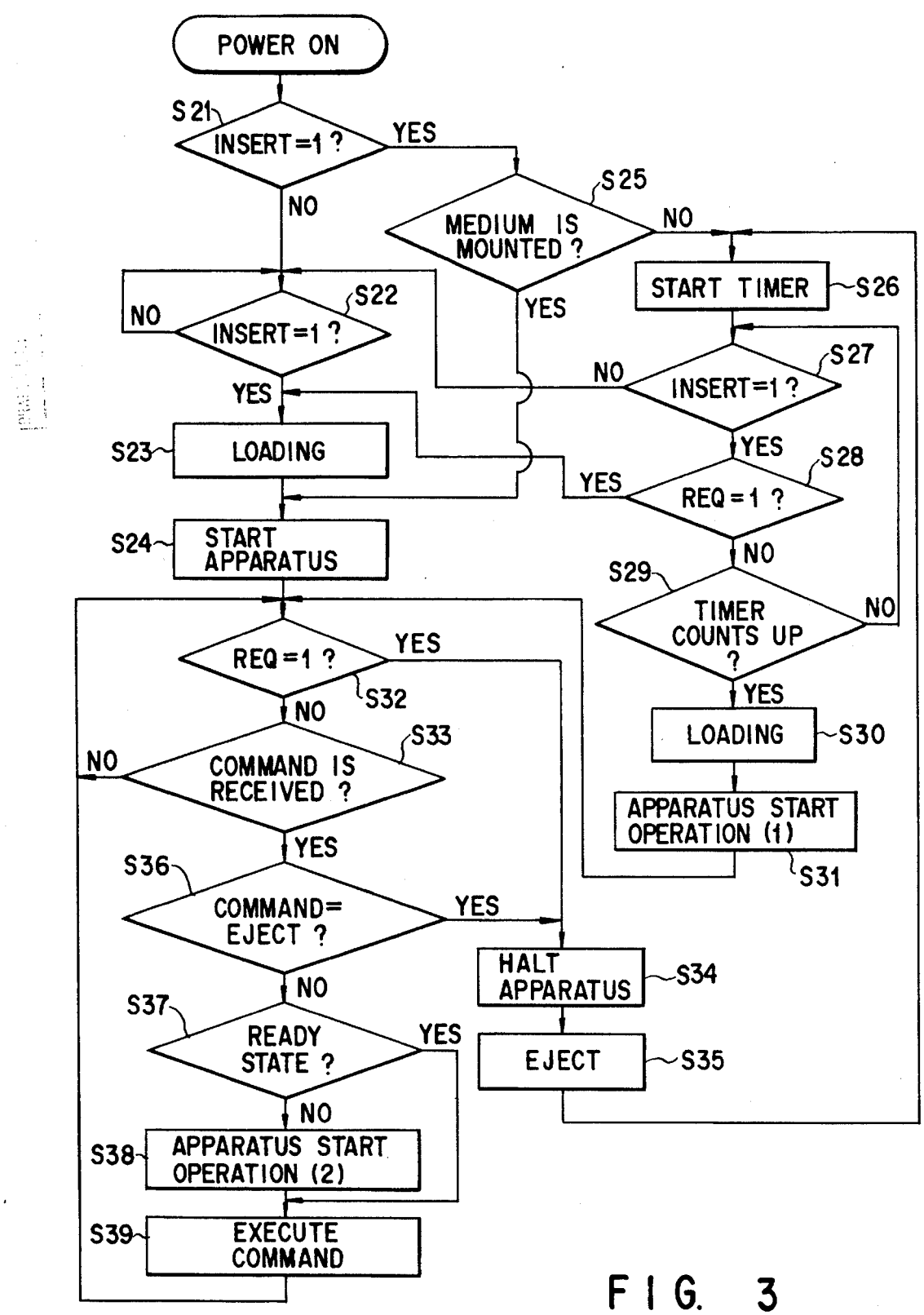
FIG. 3 is a flow chart illustrating the operation of an optical disk apparatus according to a second embodiment of the invention.

Preferred embodiments of the present invention will now be described with reference to the accompanying drawings.

FIGS. 1 and 2 show a first embodiment of the invention. FIG. 1 shows the structure of an optical disk apparatus according to a first embodiment of the present invention, and FIG. 2 is a flow chart illustrating the operation of the apparatus according to the first embodiment of the invention.

In the first embodiment, an optical disk is employed as a recording medium in the optical disk apparatus.

As shown in FIG. 1, an optical disk apparatus 1 includes a holder 3 for holding an optical disk 2 contained in a cartridge, etc. The optical disk 2 is inserted in the holder 3, and, in this state, the disk 2 can be conveyed within the apparatus 1. A holder insertion detector 4 functioning as medium insertion detecting means is provided at an innermost portion of the holder 3. The holder insertion detector 4 detects whether or not the optical disk 2 has been inserted in the holder 3.

The holder 3 is connected to a loading motor unit 5, and the holder 3 is attached to and detached from a spindle motor unit 7 according to a command from a controller 6. The optical disk 2 inserted in the holder 3 is mounted on the spindle motor unit 7 functioning as medium driving means, and thereby the disk 2 is rotated according to a command from the controller 6.

A spindle mounting detector 8 functioning as driving means mounting detector means is provided near the spindle motor unit 7. The detector 8 detects whether or not the disk 2 within the holder 3 is mounted on the spindle motor unit 7. The holder insertion detector 4 and spindle mounting detector 8 are connected to the controller 6. The controller 6 monitors the insertion of the optical disk 2 in the holder 3 and the mounting of the disk 2 on the spindle motor unit 7. The respective parts are controlled in accordance with the state of the disk 2.

The optical disk apparatus 1 is provided with a pickup unit 9, and a seek for a target point on the disk 2 and recording/reproduction are controlled by the controller 6.

Furthermore, the apparatus 1 is provided with an eject/load switch (SW) 10 for effecting ejection of the optical disk 2 (the disk 2 is removed from the spindle motor and exposed to the outside so that it can be taken out) or effecting load (the disk 2 is received into the apparatus and mounted on the spindle motor). By operating the eject/load SW 10, an eject/load request is sent to the controller 6 and the eject/load operation is performed in accordance with the mounting state of the optical disk 2.

The holder insertion detector 4 may be provided near the inlet of the holder 3, as indicated by a broken line 4' in FIG. 1. By such holder insertion detector 4', the insertion/non-insertion of even a portion of the disk 2 can be detected.

The controller 6 is connected to a host computer, for example, via a SCSI interface. According to a command from the host computer, recording/reproduction, etc. is effected. The controller 6 includes a timer unit 11 for counting a time period during which the optical disk 2 is inserted in the holder 3 and situated in the eject position. The timer unit 11 detects whether the optical disk 2 is in the eject position continuously for a predetermined time period.

Next, the operation of the optical disk apparatus according to the first embodiment will now be described.

If the optical disk 2 is inserted in the holder 3, the holder insertion detector 4 is turned on, and an insertion detection signal INSERT to be output to the controller 6 is changed from 0 to 1.

When the insertion detector 4 is turned on, i.e. when the insertion detection signal INSERT is set at 1, the controller 6 controls the loading motor unit 5 and the loading operation is effected to move the holder 3 in the loading direction until the spindle mounting detector 8 is turned on, i.e. until the optical disk 2 is mounted on the spindle motor unit 7.

When the optical disk 2 has been mounted on the spindle motor unit 7, the controller 6 performs a starting operation and controls the spindle motor unit 7. Thus, the spindle motor is driven and a laser (not shown) within the pickup unit 9 is turned on. In addition, an actuator (not shown) within the pickup unit 9 is controlled to carry out the focusing servo operation and tracking servo operation, thus setting the optical disk apparatus 1 in the ready state in which information on the disk 2 can be reproduced, recorded or erased.

Subsequently, the controller 6 performs reproduction, recording, erasure, etc. of information according to a command from the host computer (not shown).

The eject/load SW 10 is a switch by means of which the user requests loading or ejection of the optical disk 2. When the SW 10 is depressed (i.e. a request signal REQ output to the controller 6 is changed from 0 to 1), the loading/eject is effected in accordance with the insertion state of the optical disk 2 and the position of the holder 3.

When the eject/load SW 10 is depressed in the state in which the optical disk 2 is mounted on the spindle motor unit 7, the controller 6 comes into the halt state and controls the pickup unit 9 to halt the tracking servo and focusing servo. At the same time, the laser is turned off, and the spindle motor unit 7 is controlled to stop the spindle motor.

Thereafter, the controller 6 controls the loading motor unit 5, and the spindle mounting detector 8 is turned off. Thus, the eject operation is carried out such that the holder 3 is moved in the unload direction until the optical disk 2 is situated in the eject position of the optical disk apparatus 1 (i.e. the position where the disk 2 can be inserted and removed).

On the other hand, when the eject/load SW 10 is depressed in the state in which the optical disk 2 is inserted in the holder 3 and placed in the eject position, the controller 6 performs the loading and the apparatus starting operation.

When the eject operation is completed, the controller 6 starts the timer unit 11 for counting time. The optical disk 2 is automatically loaded in the apparatus unless the optical disk 2 is removed from the optical disk apparatus 1 while the timer unit 11 counts a predetermined time and the insertion detector 4 is turned off, i.e. unless the insertion detection signal INSERT is changed from 1 to 0. At this time, all or part of the apparatus starting operation is not executed, and the optical disk apparatus 1 is not set in the ready state.

Now referring to the flow chart of FIG. 2, the operation of the controller 6 will be described in detail.

When power is turned on, the controller 6 determines whether or not the insertion detection signal INSERT is 1 (step S1) and finds whether the optical disk 2 is inserted in the holder 3 of the optical disk apparatus 1.

If the disk 2 is not inserted in the apparatus 1, i.e. if the signal INSERT is 0, the control routine goes to step S2 and it is determined whether or not the insertion detection signal INSERT is 1. The control does not proceed until the disk 2 is inserted in the holder 3 and the condition, INSERT=1, is met.

If the disk 2 is inserted and the condition, INSERT=1, is met, the control goes to step S3. In the optical disk apparatus 1, the controller 6 controls the loading motor unit 5 and the loading operation is carried out such that the holder 3 is moved in the loading direction until the optical disk 2 is mounted on the spindle motor unit 7. In step S4, the apparatus starting operation is performed, and the spindle motor unit 7 is controlled to activate the spindle motor. The laser (not shown) within the pickup 9 is turned on and the actuator (not shown) within the pickup unit 9 is controlled. Thereby, the focusing servo and tracking servo are effected. Thus, the optical disk apparatus 1 is set in the ready state in which reproduction, recording or erasure of information can be effected on the optical disk 2.

On the other hand, if INSERT=1 in step S1, i.e. if the optical disk 2 is inserted in the holder 3 of the optical disk apparatus 1, the control routine goes to step 5 to determine whether the optical disk 2 is mounted on the spindle motor unit 7. If the disk 2 is mounted, the control goes to step S4 to effect the apparatus starting operation. In step S5, if the optical disk 2 is not mounted on the spindle motor unit 7, the control goes to step S6 to start the timer unit 11, thereby counting the time needed for the optical disk apparatus 1 to automatically load the disk 2.

Thereafter, it is monitored in step S7 whether the disk 2 has been removed from the optical disk apparatus 1, it is monitored in step S8 whether the eject/load SW 10 has been depressed to generate a loading request, and it is monitored in step S9 whether the timer has counted up.

In step S7, it is determined whether INSERT=1, i.e. whether the optical disk 2 has been removed from the optical disk apparatus 1. If the disk 2 has been removed from the apparatus and INSERT=1, the control routine goes to step S2 and the operations of and after the disk insertion wait will be performed.

If the state of INSERT=1 remains in step S7, it is monitored in step S8 whether or not request signal REQ=1, i.e. whether the eject/load SW 10 has been depressed and a loading request has been issued. If the loading request has been issued and REQ=1, the control goes to step S3 and the operations of and after the loading will be executed.

If the state of REQ=0 remains in step S8, it is determined whether the timer has counted up in step S9. If the timer has not counted up, the control returns to step S7, and the operations of and after step S7 will be repeated. If the counting up of the timer has been detected in step S9, the loading is executed in step S10 and the control goes to step S11.

When the optical disk 2 is mounted, the controller 6 monitors the request signal REQ in step S11 and detects an eject request issued by the depression of the eject/load SW 10. In step S12, reception of a command from the host computer is detected, and an eject request or a command from the host computer is awaited.

If it is determined in step S11 that the eject/load SW 10 has been depressed and the issuance of the eject request has been detected, the control goes to step S13, and the operation for stopping the apparatus is executed. Specifically, the pickup unit 9 is controlled to halt the tracking servo and focusing servo and turn off the laser. In addition, the spindle motor unit 5 is controlled to stop the spindle motor. In step S14, the eject operation is performed. Specifically, in step S14, the loading motor unit 5 is controlled to turn off the spindle mounting detector 8 and move the holder 3 in the unload direction until the optical disk 2 is situated in the eject position in the optical disk apparatus 1 (i.e. the position where the optical disk 2 can be inserted and ejected). Thereafter, the control routine returns to step S6 and the subsequent operation will be executed.

If the command from the host computer has not been received in step S12, the control returns to step S11. If that command has been received, the command is executed in step S15 and the subsequent steps.

At first, it is determined in step S15 whether the received command is an eject command. If it is the eject command, the control advances to step S13. The apparatus halt operation is executed in step S13 and the eject operation is executed in step S14. Thereafter, the operations of and after step S6 will be carried out. If the received command is not the eject command in step S15, it is determined in step S16 whether or not the optical disk apparatus 1 is in the ready state.

If the apparatus 1 is not in the ready state in step S16, the apparatus start operation is executed in step S17 and then the command is executed in step S18. If the apparatus 1 is in the ready state in step S16, the control goes to step S18. The commands from the host computer includes, e.g. a reproduction command, a recording command, and an erase command, in addition to the eject command.

After the command from the host computer is executed in step S18, the control returns to step S11 and the eject request or the command from the host computer is awaited.

As has been described above, when the optical disk 2 is inserted and loaded in the optical disk apparatus 1 ("YES" in step S2) or when the eject/load SW 10 is depressed ("YES" in step S8) while the optical disk 2 is left in the eject position of the apparatus 1 and the disk 2 is loaded, i.e. when the optical disk 2 is loaded according to the user's request, the disk 2 to be immediately accessed is loaded and therefore the apparatus start operation is executed in step S4 and the apparatus is set in the ready state. Thus, in the steps of and after S11, the optical disk 2 can immediately be accessed in response to the command from the host computer.

In the case where the optical disk 2 is left in the eject position for a predetermined time period ("YES" in step S9) and it is automatically loaded, the disk 2, which does not need to be accessed immediately after it was left, is loaded. Thus, the apparatus is not started until the access command for access to the disk 2 from the host computer received after the loading. In the present embodiment, the apparatus can be selectively set in the ready state according to the state in which the disk 2 is loaded. Therefore, excess power consumption is prevented and the life of the laser is not shortened. As a result, the degradation in quality of the optical disk apparatus 1 can be prevented and the life of the apparatus can be increased.

FIG. 3 is a flow chart illustrating the operation of an optical disk apparatus according to a second embodiment of the present invention.

The second embodiment is a modification of the first embodiment. Specifically, a modification is made to the apparatus driving operation, in the case where the optical disk 2 was left for a predetermined time period and automatically loaded.

The operation of the controller 6 will now be described in detail with reference to the flow chart of FIG. 3.

When power is turned on, the controller 6 determines whether or not the insertion detection signal INSERT is 1 (step S21) and finds whether the optical disk 2 is inserted in the holder 3 of the optical disk apparatus 1.

If the disk 2 is not inserted in the apparatus 1 (INSERT is 0), the control routine goes to step S22 and it is determined whether or not the insertion detection signal INSERT is 1. The control does not proceed until the disk 2 is inserted in the holder 3.

If the disk 2 is inserted (INSERT=1), the control goes to step S23. In step S4, the apparatus starting operation is performed, and the spindle motor unit 7 is controlled to activate the spindle motor. The laser (not shown) within the pickup 9 is turned on and the actuator (not shown) within the pickup unit 9 is controlled. Thereby, the focusing servo and tracking servo are effected. Thus, the optical disk apparatus 1 is set in the ready state in which reproduction, recording or erasure of information can be effected on the optical disk 2.

On the other hand, if INSERT=1 in step S21, i.e. if the optical disk 2 is inserted in the holder 3 of the optical disk apparatus 1, the control routine goes to step 25 to determine whether the optical disk 2 is mounted on the spindle motor unit 7. If the disk 2 is mounted, the control goes to step S24 to effect the apparatus starting operation. In step S25, if the optical disk 2 is not mounted on the spindle motor unit 7, the control goes to step S26 to start the timer unit 11, thereby counting the time needed for the optical disk apparatus 1 to automatically load the disk 2.

Thereafter, it is monitored in step S27 whether the disk 2 has been removed from the optical disk apparatus 1, it is monitored in step S28 whether the eject/load SW 10 has been depressed to generate a loading request, and it is monitored in step S29 whether the timer has counted up.

In step S27, it is determined whether INSERT=1, i.e. whether the optical disk 2 has been removed from the optical disk apparatus 1. If it is determined that the disk 2 has been removed from the apparatus, the control routine goes to step S22 and the operations of and after the disk insertion wait will be performed.

If the state of INSERT=1 remains in step S27, it is monitored in step S28 whether or not request signal REQ=1, i.e. whether the eject/load SW 10 has been depressed and a loading request has been issued. If the loading request has been issued and REQ=1, the control goes to step S23 and the operations of and after the loading will be executed.

If the state of REQ=0 remains in step S28, it is determined whether the timer has counted up in step S29. If the timer has not counted up, the control returns to step S27, and the operations of and after step S27 will be repeated. If the counting up of the timer has been detected in step S29, the loading is executed in step S30 and in step S31 an apparatus start operation (1) is executed. In the apparatus start operation (1), only the spindle motor which requires much start time is started and the operations of and after step S32 will be executed.

When the optical disk 2 is mounted, the controller 6 monitors the request signal REQ in step S32 and detects an eject request issued by the depression of the eject/load SW 10. In step S33, reception of a command from the host computer is detected, and an eject request or a command from the host computer is awaited.

If it is determined in step S32 that the eject/load SW 10 has been depressed and the issuance of the eject request has been detected, the control goes to step S34, and the operation for stopping the apparatus is executed. In step S35, the eject operation is executed and the control returns to step S26.

If the command from the host computer has not been received in step S33, the control returns to step S32. If that command has been received, the command is executed in step S36 and the subsequent steps.

At first, it is determined in step S36 whether the received command is an eject command. If it is the eject command, the apparatus halt operation is executed in step S34 and the eject operation is executed in step S35. Thereafter, the operations of and after step S26 will be carried out. If the received command is not the eject command in step S36, it is determined in step S37 whether or not the optical disk apparatus 1 is in the ready state.

If the apparatus 1 is not in the ready state in step S37, an apparatus start operation (2) is executed in step S38 and then the command is executed in step S39. In the apparatus start operation (2), the laser is turned on, and the focusing servo and tracking servo are turned on. If the apparatus 1 is in the ready state, the control goes to step S39 and the command is executed.

After the command from the host computer is executed in step S39, the control returns to step S32 and the eject request or the command from the host computer is awaited.

As has been described above, like the first embodiment, when the optical disk 2 is inserted and loaded in the optical disk apparatus 1 ("YES" in step S22) or when the eject/load SW 10 is depressed ("YES" in step S28) while the optical disk 2 is left in the eject position of the apparatus 1 and the disk 2 is loaded, i.e. when the optical disk 2 is loaded according to the user's request, the apparatus start operation is executed in step S4 and the apparatus is set in the ready state. Thus, in the steps of and after S32, the optical disk 2 can immediately be accessed in response to the command from the host computer.

Besides, in the case where the optical disk 2 is left in the eject position for a predetermined time period ("YES" in step S29) and it is automatically loaded, only the spindle motor which requires much start time is started in the apparatus start operation (1). Until the command from the host computer for access to the optical disk 2 is received after the loading, the apparatus start operation (2) including turning-on of the laser, etc. is not executed. Thus, the apparatus can be selectively set in the ready state according to the state in which the disk 2 is loaded. Therefore, unnecessary turning-on of the laser is prevented and power consumption due to focusing servo and tracking servo is reduced. Since the life of the laser is not shortened, the life of the apparatus 1 can be increased.

Since the processing time for the apparatus start operation (2) in step S38 is relatively short, the access to the optical disk 2 is effected more quickly than in the first embodiment.

As has been described above, the present invention can provide an information recording/reproducing apparatus having a function of automatically loading a recording medium which has been left in an eject position for a predetermined time period, wherein the apparatus can be selectively set in the ready state according to the state in which a loading command is issued, whereby excess power consumption is reduced and the life of the apparatus can be increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording/reproducing apparatus, comprising:

loading means for automatically loading a recording medium in a predetermined position within said apparatus;

detecting means for detecting whether or not an external loading request is issued within a predetermined time period after the recording medium is left in an eject position where the recording medium can be inserted in and removed from the apparatus; and control means for setting the apparatus in a ready state in which at least one of information reproduction, information recording and information erasure can be effected, after the recording medium is loaded by said loading means, in the case where said detecting means has detected the external loading request within the predetermined time period, and for setting the apparatus in a non-ready state after the recording medium is loaded by said loading means, in the case where said detecting means has not detected the external loading request within the predetermined time period.

\* \* \* \* \*